(12) United States Patent
Clerckx et al.

(10) Patent No.: US 8,498,356 B2
(45) Date of Patent: Jul. 30, 2013

(54) APPARATUS AND METHOD OF GENERATING CODEBOOK FOR MULTIPLE INPUT MULTIPLE OUTPUT COMMUNICATION SYSTEM

(75) Inventors: Bruno Clerckx, Yongin-si (KR); Yongxing Zhou, Beijing (CN); Sung Jin Kim, Gyeonggi-do (KR); David J. Love, West Lafayette, IN (US); Il Han Kim, Chungcheongbuk-do (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1525 days.

(21) Appl. No.: 12/056,340

(22) Filed: Mar. 27, 2008

(65) Prior Publication Data

US 2008/0256163 A1   Oct. 16, 2008

Related U.S. Application Data

(60) Provisional application No. 60/911,593, filed on Apr. 13, 2007, provisional application No. 60/929,009, filed on Jun. 8, 2007.

(30) Foreign Application Priority Data

Oct. 5, 2007   (KR) .................. 10-2007-0100650

(51) Int. Cl.
*H04B 7/02* (2006.01)
(52) U.S. Cl.
USPC ..................... 375/267; 370/210; 375/260
(58) Field of Classification Search
USPC ............... 370/210, 219; 375/260, 267, 347; 455/562.1; 708/607
See application file for complete search history.

(56) References Cited

U.S. PATENT DOCUMENTS

| | | | | |
|---|---|---|---|---|
| 5,666,370 | A * | 9/1997 | Ganesan et al. | 714/752 |
| 7,342,875 | B2 * | 3/2008 | Hammons et al. | 370/219 |
| 2005/0286663 | A1 * | 12/2005 | Poon | 375/347 |
| 2007/0097856 | A1 * | 5/2007 | Wang et al. | 370/210 |
| 2008/0081669 | A1 * | 4/2008 | Kwon et al. | 455/561 |

* cited by examiner

*Primary Examiner* — Leon-Viet Nguyen
(74) *Attorney, Agent, or Firm* — NSIP Law

(57) ABSTRACT

An apparatus and method of generating a codebook. The codebook generation apparatus includes a matrix extender to generate a candidate matrix set by multiplying a base matrix and at least one diagonal matrix, wherein the at least one diagonal matrix includes elements of a constrained set as diagonal elements; and a codebook generator to generate the codebook where a minimum distance between the elements is maximized, based on the candidate matrix set. According to aspects of the present invention, it is possible to provide a precoding codebook that can reduce an amount of feedback from a terminal.

20 Claims, 9 Drawing Sheets

FIG. 2

$$W_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \quad W_2 = \begin{bmatrix} 1 & 1 & 0 & 0 \\ 1 & -1 & 0 & 0 \\ 0 & 0 & 1 & 1 \\ 0 & 0 & 1 & -1 \end{bmatrix}, \quad W_3 = \begin{bmatrix} 1 & 1 & 0 & 0 \\ j & -j & 0 & 0 \\ 0 & 0 & 1 & 1 \\ 0 & 0 & j & -j \end{bmatrix}$$

$$W_4 = X_b$$
$$W_5 = D_1 \cdot W_4$$
$$W_6 = D_2 \cdot W_4$$
$$W_7 = D_3 \cdot W_4$$
$$W_8 = D_4 \cdot W_4$$

FIG. 8

|  | | | | $X_b$ | $D_{11}X_b$ | $D_{12}X_b$ | $D_{13}X_b$ | $D_{14}X_b$ |
|---|---|---|---|---|---|---|---|---|
| Set 1 810 | $W_{11}$ | $W_{12}$ | $W_{13}$ | $W_{14}$ | $W_{15}$ | $W_{16}$ | $W_{17}$ | $W_{18}$ |
|  | | | | $X_b$ | $D_{21}X_b$ | $D_{22}X_b$ | $D_{23}X_b$ | $D_{24}X_b$ |
| Set 2 820 | $W_{21}$ | $W_{22}$ | $W_{23}$ | $W_{24}$ | $W_{25}$ | $W_{26}$ | $W_{27}$ | $W_{28}$ |

⋮

|  | | | | $X_b$ | $D_{L1}X_b$ | $D_{L2}X_b$ | $D_{L3}X_b$ | $D_{L4}X_b$ |
|---|---|---|---|---|---|---|---|---|
| Set L 830 | $W_{L1}$ | $W_{L2}$ | $W_{L3}$ | $W_{L4}$ | $W_{L5}$ | $W_{L6}$ | $W_{L7}$ | $W_{L8}$ |

APPARATUS AND METHOD OF GENERATING CODEBOOK FOR MULTIPLE INPUT MULTIPLE OUTPUT COMMUNICATION SYSTEM

CROSS-REFERENCE TO RELATED APPLICATIONS

This application claims the benefit of U.S. Provisional Application No. 60/911,593, filed on Apr. 13, 2007, and No. 60/929,009, filed on Jun. 8, 2007, in the U.S. Patent and Trademark Office, and the benefit of Korean Patent Application No. 2007-100650, filed on Oct. 5, 2007 in the Korean Intellectual Property Office, the disclosures of which are incorporated herein by reference.

BACKGROUND OF THE INVENTION

1. Field of the Invention

Aspects of the present invention relate to a multiple input multiple output (MIMO) communication system, and more particularly, to a closed-loop communication control scheme that can feed back channel information from a user equipment to a base station.

2. Description of the Related Art

A multiple input multiple output (MIMO) communication system is a system that can transmit and receive data between at least one base station and at least one user equipment. In the MIMO communication scheme, since each base station and user equipment includes a plurality of antennas, it is possible to improve the efficiency of transmitting and receiving data.

The MIMO communication system can simultaneously transmit data from the base station to the user equipment using a plurality of antennas and also may improve a transmission rate of information by a spatial division multiple access (SDMA) scheme. The SDMA scheme allocates a plurality of spatial beams to the user equipment and transmits data to the user equipment using each of the spatial beams. A process of allocating the spatial beams is referred to as "precoding" or "beamforming." A precoding process or a beamforming process may be performed through the computation with respect to a matrix or a vector.

The precoding process or the beamforming process can adopt a scheme in which a base station is aware of information about a communication channel that reaches a user equipment, or a scheme in which a user equipment can feed back channel information to a base station. A channel information feedback scheme is a closed-loop communication control scheme.

The closed-loop communication control scheme is advantageous in that it is possible to accurately reflect a channel state changing over time. However, a user equipment included in a communication system should compute a channel feature according to the change of the channel state. Therefore, hardware of the user equipment becomes complex.

Accordingly, there is a need for an apparatus and method of generating a codebook that can maintain advantages of a closed-loop communication control scheme applied in a MIMO communication system and also can be easily realized in hardware of a user equipment.

SUMMARY OF THE INVENTION

Aspects of the present invention provide an apparatus and method of generating a codebook that can maintain advantages of a closed-loop communication control scheme applied in a multiple input multiple output (MIMO) communication system and also can be easily realized in hardware of a user equipment.

Other aspects of the present invention also provide an apparatus and method of generating a codebook that can more effectively transmit data in comparison to a conventional data transmission mode selecting method with respect to a user equipment, even in an environment where a value that describes a channel feature is constrained.

According to an aspect of the present invention, an apparatus to generate a codebook to transmit and receive data to and from a plurality of user equipment is provided. The apparatus includes a matrix extender to generate a candidate matrix set by multiplying a base matrix and at least one diagonal matrix, wherein the at least one diagonal matrix includes elements of a constrained set as diagonal elements; and a codebook generator to generate the codebook where a minimum distance between the elements is maximized, based on the candidate matrix set.

According to another aspect of the present invention, a method of generating a codebook to transmit and receive data is provided. The method includes generating a candidate matrix set by multiplying a base matrix and at least one diagonal matrix, wherein the at least one diagonal matrix includes elements of a constrained set as diagonal elements; and generating the codebook where a minimum distance between the elements is maximized, based on the candidate matrix set.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates a process of generating a candidate matrix set using an apparatus and method of generating a codebook according to an embodiment of the present invention;

FIG. 8 illustrates an example of a candidate matrix set that is generated by the matrix extender shown in FIG. 3;

DETAILED DESCRIPTION OF THE EMBODIMENTS

Figure 1:
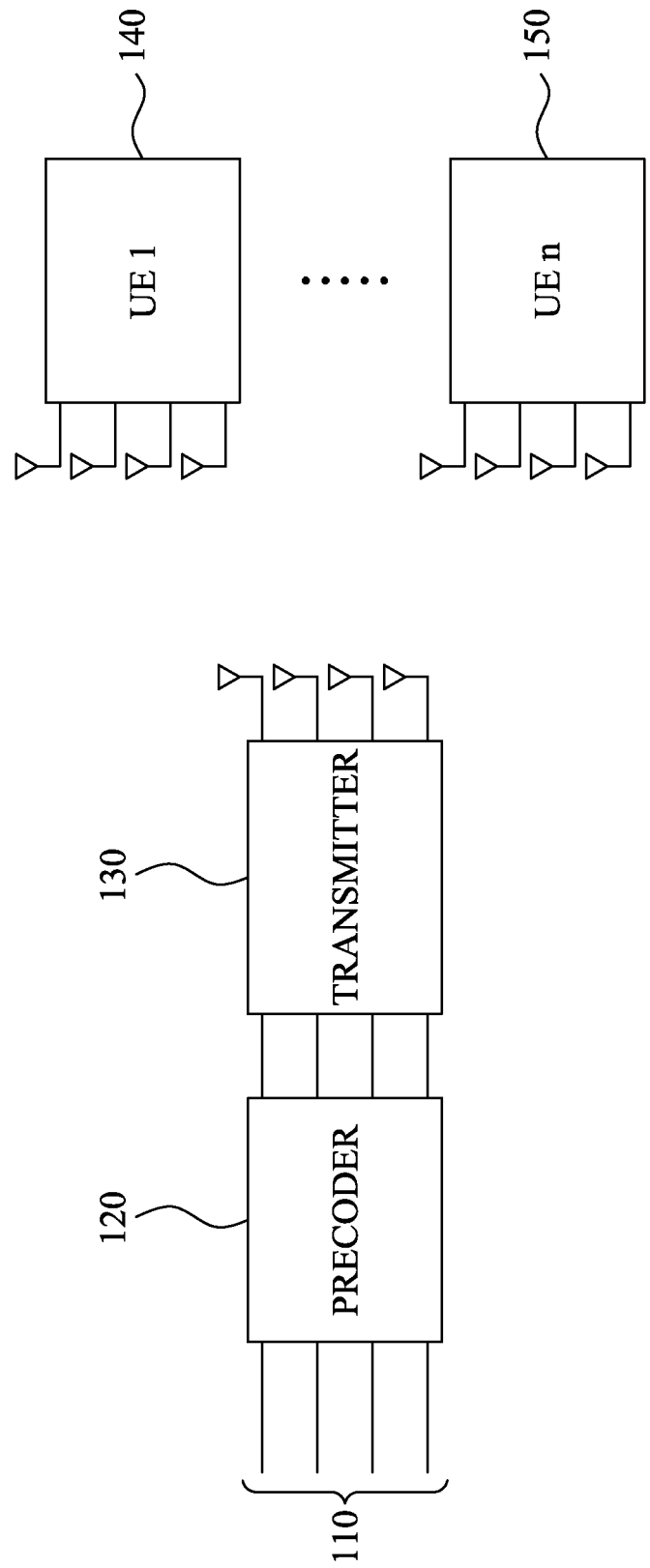
FIG. 1 illustrates a MIMO communication system adopting an apparatus or method of generating a codebook according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 shows a multiple input multiple output (MIMO) communication system adopting an apparatus or method of generating a codebook according to an embodiment of the present invention. The MIMO communication system transmits a signal packet 110 to any one of, for example, a user equipment UEn 150, of a plurality of user equipments UE1 140 through UEn 150 via a precoder 120 and a transmitter 130.

The precoder 120 allocates the signal packet 110 to a plurality of antennas of the transmitter 130 at different ratios, based on appropriate power distribution, improvement of transmission efficiency, and the like. A process performed by the precoder 120 is generally referred to as "precoding," and may be performed through a computation process of multiplying a matrix, including a plurality of spatial beams, by a vector corresponding to the signal packet 110.

Each of the spatial beams may correspond to a spatial direction that is transmitted from a base station to each of the user equipment UE1 140 through UEn 150. In single user MIMO systems, the precoder 120 determines the number of data streams transmitted to any one of, for example, the UE1 140. In this case, each vector corresponds to a data stream transmitted to the UE1 140.

A number of rows or columns of the matrix to be multiplied in the precoding process may be determined by the number of transmitting antennas at the base station. For example, when four transmitting antennas are at the base station, the matrix may have four rows. When four transmitting antennas are at the base station, a maximum of four data streams in the signal packet 110 may be simultaneously transmitted. The number of data streams that can be simultaneously transmitted may be adjusted to any one of 1 through 4, depending on a communication environment. The adjusted number of data streams that can be simultaneously transmitted is generally referred to as a transmission rank.

The matrix to be multiplied in the precoding process may be determined based on a communication channel feature from the base station to the user equipment. An open-loop communication control scheme is a scheme in which the base station pre-stores information about the communication channel feature and determines a matrix based on the pre-stored information during the precoding process. In contrast, a closed-loop communication control scheme is a scheme in which each user equipment computes the communication channel feature using a pilot signal and feeds back information about the computed communication channel feature to the base station to determine the matrix based on the fed back information.

In the case of the open-loop communication control scheme, the base station may not accurately identify information about an instantaneously changing communication channel feature. In the case of the closed-loop communication control scheme, the base station may accurately identify information about the communication channel feature. However, hardware should be installed in the user equipment in order to compute information about the communication channel feature. When a great amount of information is fed back from the user equipment, a load of the base station also increases due to processing of the fed back information.

Conversely, despite the above-described disadvantages, the closed-loop communication control scheme is widely used since the closed-loop communication control scheme can accurately identify information about instantaneously changing communication scheme features. According to one aspect of the present invention, a scheme is provided that can constrain elements of a matrix to be multiplied during the precoding process within a predetermined range and thereby can simplify a computation process of channel feature information at each user equipment. According to an aspect of the present invention, an apparatus and method of generating a codebook is provided, which can optimize a data transmission efficiency in the precoding process where only values within a predetermined range are used as elements of a matrix.

The codebook generation apparatus and method may generate a codebook that has N elements. When N is a natural number that satisfies $N=2^B$, the precoding process and the process of computing information about a communication channel feature at a user equipment may be simplified.

The codebook generation apparatus and method may generate a constrained set by collecting the values within the predetermined range. The values may be selected from real numbers and also from complex numbers within the predetermined range. In the present specification, j is used as an imaginary number unit. Since the value within the predetermined range includes a combination of the real number and the imaginary number j, the combination may be referred to as "alphabet."

The constrained set may be $\{1, -1, j, -j\}$. Each element of the constrained set $\{1, 1, j, -j\}$ exists on a unit circumference of a complex plane and hangs over four axes. Therefore, a unitary matrix may be readily generated from the elements of the constrained set $\{1, -1, j, -j\}$. All the distances between the elements of the constrained set $\{1, -1, j, -j\}$ are constant. The elements may correspond to a transmission symbol of a quadrature phase shift keying (QPSK) scheme. According to an aspect of the present invention, a combination of each element of the constrained set $\{1, 1, j, -j\}$ may build vectors. If those vectors are used as precoders, then those vectors may correspond to a spatial domain that forms spatial beams at the base station.

The user equipment computes channel quality information (CQI) by reflecting the instantaneously changing channel features and feeds back the computed CQI to the base station. In an aspect of the present invention, elements of the codebook may use only a constrained alphabet. Therefore, the user equipment may easily compute CQI and hardware of the user equipment may be simplified.

FIG. 2 shows an example of a process of generating a candidate matrix set using an apparatus and method of generating a codebook according to an embodiment of the present invention. As shown in FIG. 2, in the process of generating the candidate matrix set, the generated example of candidate matrix set including eight matrices is generated.

For example, when the base station has four transmitting antennas, a maximum of four data streams may be simultaneously transmitted. Therefore, a precoding matrix is a 4×4 matrix. As shown in FIG. 2, $W_1$ is a 4×4 identity matrix. $W_2$ and $W_3$ are diagonal matrices or block diagonal matrices. A matrix $W_4$ is selected as a base matrix $X_b$ during the process of generating the candidate matrix set. The matrix $W_4$ is a matrix that is generated by a digital Fourier transform (DFT). According to other aspects of the present invention, the matrices $W_1$, $W_2$, $W_3$, and $W_4$ may have different forms.

Diagonal matrices $D_1$, $D_2$, $D_3$, and $D_4$ are selected during the process of generating the candidate matrix set. The diagonal matrices $D_1$, $D_2$, $D_3$, and $D_4$ select elements of the constrained set $\{1, -1, j, -j\}$ as diagonal elements.

For example, the diagonal matrix $D_1$ may be selected according to Equation 1:

$$D_1 = \begin{bmatrix} 1 & 0 & 0 & 0 \\ 0 & j & 0 & 0 \\ 0 & 0 & 1 & 0 \\ 0 & 0 & 0 & -j \end{bmatrix}. \quad \text{[Equation 1]}$$

For example, when it is a goal to generate the candidate matrix set having eight elements during the process of generating the candidate matrix set, four matrices should be additionally generated in addition to four preliminary candidate matrices $W_1$, $W_2$, $W_3$, and $W_4$ that exist before the candidate matrix set generation process. The additionally generated four matrices may be obtained by multiplying the selected diagonal matrices $D_1$, $D_2$, $D_3$, and $D_4$ by the base matrix $W_4$.

Figure 3:
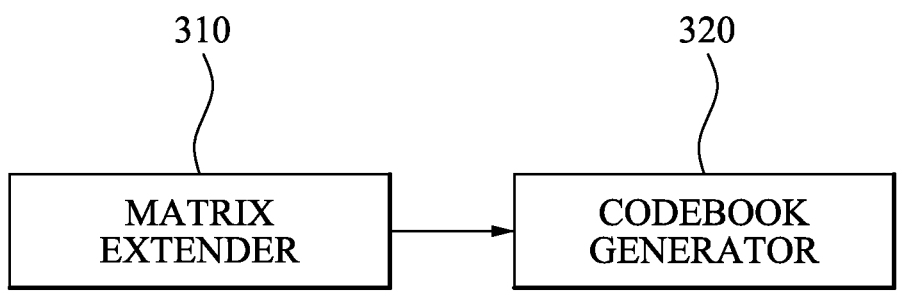
FIG. 3 is a block diagram illustrating an apparatus of generating a codebook according to an embodiment of the present invention.

FIG. 3 shows an example of apparatus 300 to generate a codebook according to an embodiment of the present invention. The codebook generation apparatus 300 includes a matrix extender 310 and a codebook generator 320. According to other aspects of the present invention, the codebook generation apparatus 300 may include additional and/or other units. Similarly, the functionality of the above units may be integrated into a single component.

The matrix extender 310 generates a candidate matrix set by multiplying a base matrix and at least one diagonal matrix. The at least one diagonal matrix includes elements of a constrained set as diagonal elements.

The codebook generator 320 generates the codebook where a minimum distance between the elements is maximized, based on the candidate matrix set. According to an aspect of the present invention, an element of the codebook may be a matrix that includes a predetermined number of columns based on a number of simultaneously transmitted data streams. As described above, the adjusted number of data streams that can be simultaneously transmitted to a plurality of user equipment is referred to as a transmission rank. For example, when four transmitting antennas are at the base station, the transmission rank may have a value of 1 through 4. For example, when four transmitting antennas are at the base station and the transmission rank is two, elements of the codebook may be 4×2 matrices.

According to an aspect of the present invention, the elements of the codebook may be obtained from the pre-generated preliminary candidate matrices in addition to the generated candidate matrix set. The candidate matrix set may also be generated by multiplying the base matrix and all the diagonal matrices that are obtainable from the elements of the constrained set. The constrained set may be $\{1, -1, j, -j\}$.

For example, when M transmitting antennas are at the base station and the transmission rank is k, the base matrix is an M×M unitary matrix and the diagonal matrix to be multiplied with the base matrix is an M×M diagonal matrix. When the constrained set includes A elements, $A^M$ number of M×M diagonal matrices are available. Among those $A^M$ number of M×M diagonal matrices, a complex number fold of the identity matrix may be regarded as to be equivalent of the identity matrix. Therefore, $(A^{M-1}-1)$ number of M×M diagonal matrices may be considered.

When n preliminary candidate matrices are generated, the number of candidate matrices that can be considered in generating the codebook may be $(A^{M-1}+n-1)$. For example, when M transmitting antennas are at the base station and the transmission rank is k, the number of cases where k columns are selected from M columns of each candidate matrix is $$\binom{M}{k}.$$

Therefore, a total of M×k matrices that can be considered in generating the codebook is $$(A^{M-1}+n-1) \times \binom{M}{k}.$$

For example, when the number of elements of the codebook is pre-set to N, the codebook generator 320 generates $$\binom{(A^{M-1}+n-1)\binom{M}{k}}{N}$$

combinations of M×k matrices where N are selected from the total of $$(A^{M-1}+n-1) \times \binom{M}{k}$$

number of M×k matrices. The codebook generator 320 selects the optimal combination where the minimum distance between M×k matrices in the generated combination is maximized and generates the selected optimal combination as the codebook.

Figure 5:
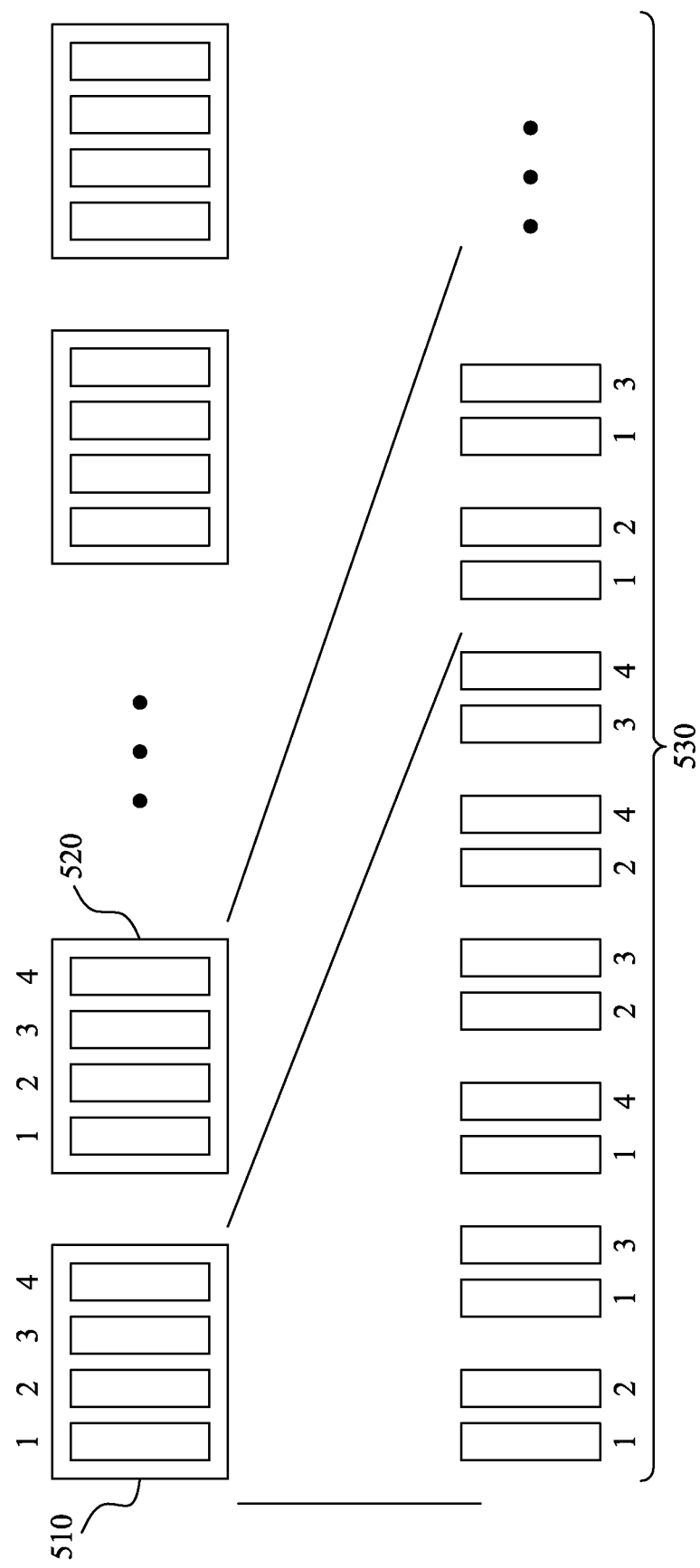
FIG. 5 illustrates a portion of a codebook generation process that is performed by the codebook generator shown in FIG. 3.

The codebook generation process performed by the codebook generator 320 of FIG. 3 will be described with reference to FIGS. 5 and 6. FIG. 5 shows an example of a codebook generation process that is performed by the codebook generator 320 of FIG. 3. As shown in FIG. 5, the codebook generator 320 selects two columns from each element of the candidate matrix set and generates a set 530 where rank matrices are extended.

The codebook generation process shown in FIG. 5 may be applied to an environment where four transmitting antennas are at the base station and two data streams are simultaneously transmitted. Elements of the candidate matrix set constitute a 4×4 matrix and a rank matrix that includes the same number of columns as the number of simultaneously transmitted data streams is a 4×2 matrix.

Figure 6:
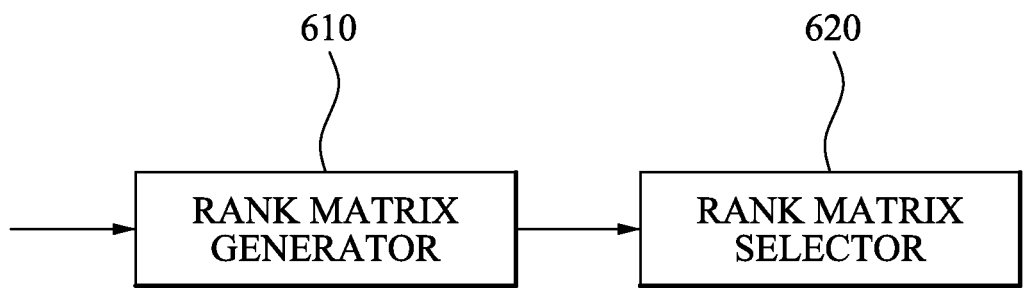
FIG. 6 is a block diagram illustrating an example of the codebook generator shown in FIG. 3.

FIG. 6 shows an example of the codebook generator 320 shown in FIG. 3. The codebook generator 320 includes a rank matrix generator 610 and a rank matrix selector 620. The rank matrix generator 610 generates rank matrices from each element of the candidate matrix set. Each of the rank matrices includes the same number of columns as the number of simultaneously transmitted data streams. The rank matrix selector 620 selects a predetermined number of rank matrices from the rank matrices and generates the codebook.

For example, the rank matrix generator 610 may select two respective columns from four columns of a 4×4 matrix 510 (shown in FIG. 5) and generate 6 ($=_4C_2$) rank matrices. The rank matrix generator 610 may also select two respective columns from four columns of a 4×4 matrix 520 (shown in FIG. 5) and generate 6 rank matrices.

When the number of elements of a codebook is pre-set to N, the rank matrix selector 620 may generate combinations of rank matrices, from rank matrices of the extended set 530. Each combination may include N rank matrices. The rank matrix selector 620 finally selects a combination of rank matrices where the minimum distance between rank matrices within the combinations is maximized, and generates the selected combination of rank matrices as the codebook.

Figure 7:
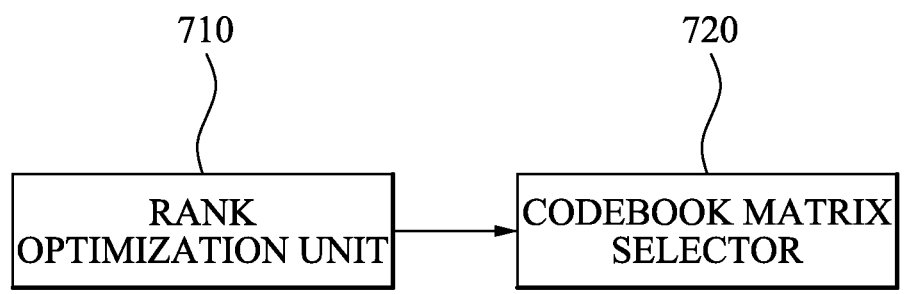
FIG. 7 is a block diagram illustrating another example of the codebook generator shown in FIG. 3.

FIG. 7 shows another example of the codebook generator 320 shown in FIG. 3. The codebook generator 320 includes a rank optimization unit 710 and a codebook matrix selector 720.

The rank optimization unit 710 generates an optimized matrix set for each rank that includes optimized elements. Each rank denotes one of the simultaneously transmitted data streams. According to an aspect of the present invention, the rank optimization unit 710 may generate the optimized matrix set for each rank that includes optimized elements so that the minimum distance between columns is maximized. Each element includes the same number of columns as the number of simultaneously transmitted data streams. The codebook matrix selector 720 generates, as the codebook, a set of matrices that are common among the optimized matrix sets for each rank.

When M transmitting antennas are at the base station, for example, a maximum of M data streams may be simultaneously transmitted. Therefore, the transmission rank may have a value of 1 through M. The rank optimization unit 710 may search for a combination or combinations of optimized matrices with respect to transmission rank 1.

When the rank optimization unit 710 searches more than one combination of optimized matrices with respect to transmission rank 1, the rank optimization unit 720 searches the combinations of optimized matrices with respect to transmission rank 2 from among the combinations of optimized matrices with respect to transmission rank 1. Through the above scheme, the rank optimization unit 710 may search for the combination of optimized matrices with respect to all possible transmission ranks 1 through M and generate an optimized matrix set for each rank.

FIG. 8 shows an example of a candidate matrix set that is generated by the matrix extender 310 of FIG. 3. A candidate matrix set (Set 1) 810 includes $W_{11}, W_{12}, W_{13}, W_{14}$ that are preliminary candidate matrices to be input in the matrix extender 310. The matrix extender 310 extends four preliminary candidate matrices $W_{11}, W_{12}, W_{13}$, and $W_{14}$ and generates the candidate matrix set (Set 1) 810, another candidate matrix set (Set 2) 820, and still another candidate matrix set (Set L) 830.

It is assumed that following relations are achieved:

$W_{i1}=W_1 \forall i=1$ to L $W_{i2}=W_2 \forall i=1$ to L $W_{i3}=W_3 \forall i=1$ to L $W_{i4}=W_4 \forall i=1$ to L The matrix extender 310 selects the fourth preliminary candidate matrix, $W_{i4}=W_4 \forall i=1$ to L, as the base matrix $X_b$, multiplies the base station $X_b$ by each of four diagonal matrices and generates the candidate matrix sets (Set 1, Set 2, and Set L) 810, 820, and 830. Under the above assumptions, the base matrix of each candidate matrix set is the same, for example, $W_4$, and thus each candidate matrix set is determined by the four diagonal matrices to be multiplied with the base matrix $X_b$.

The candidate matrix set (Set 1) 810 includes matrices that are generated by multiplying four preliminary candidate matrices and the base matrix by four diagonal matrices $D_{11}, D_{12}, D_{13}$, and $D_{14}$, respectively. The candidate matrix set (Set 2) 820 includes matrices that are generated by multiplying four preliminary candidate matrices and the base matrix by four diagonal matrices $D_{21}, D_{22}, D_{23}$, and $D_{24}$, respectively. The candidate matrix set (Set L) 830 includes matrices that are generated by multiplying four preliminary candidate matrices and the base matrix by four diagonal matrices $D_{L1}, D_{L2}, D_{L3}$, and $D_{L4}$, respectively.

Referring again to FIG. 7, the rank optimization unit 710 searches L candidate matrix sets for candidate matrix sets where the minimum distance between columns is maximized with respect to a rank 1.

Figure 9:
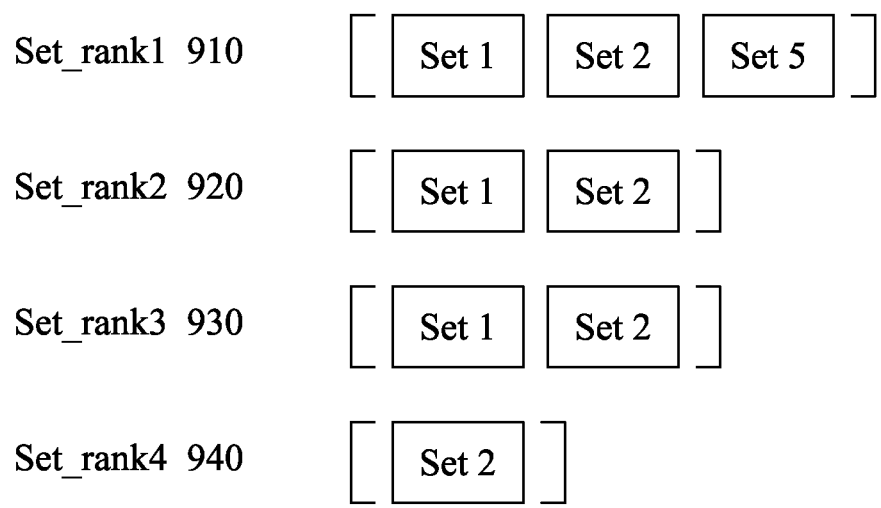
FIG. 9 illustrates examples of an optimized matrix set for each rank that is generated by searching of the rank optimization unit shown in FIG. 7.

FIG. 9 shows examples of an optimized matrix set for each rank that is generated by searching of the rank optimization unit 710. An optimized matrix set for rank 1, that is, Set_rank1 910, is generated in such a manner that the rank optimization unit 710 performs searching with respect to the rank 1. Set_rank1 910 includes the candidate matrix set (Set 1) 810, the candidate matrix set (Set 2) 820, and another candidate matrix set (Set 5). In this instance, Set_rank1 910 includes elements greater than one, and thus the rank optimization unit 710 searches the elements of Set_rank1 910 for candidate matrix sets that are optimized with respect to a rank 2.

The rank optimization unit 710 searches the elements of Set_rank1 910 for candidate matrix sets where the minimum distance between two columns is maximized. Another optimized matrix set for rank 2, Set_rank2 920, is generated in such a manner that the rank optimization unit 710 performs searching with respect to the rank 2. Set_rank2 920 includes the candidate matrix sets (Set 1) 810 and (Set 2) 820.

Since Set_rank2 920 includes more than one element, and thus the rank optimization unit 710 searches the elements of Set_rank2 920 for candidate matrix sets that are optimized with respect to a rank 3. The rank optimization unit 710 searches the elements of Set_rank2 920 for candidate matrix sets where the minimum distance between three columns is maximized. Still another optimized matrix set for the rank 3, Set_rank3 930, is generated in such a manner that the rank optimization unit 710 performs searching with respect to the rank 3. Set_rank3 930 includes the candidate matrix sets (Set 1) 810 and (Set 2) 820.

Since Set_rank3 930 includes more than one element, the rank optimization unit 710 searches the elements of Set_rank3 930 for candidate matrix sets that are optimized with respect to a rank 4. The rank optimization unit 710 searches the elements of Set_rank3 930 for candidate matrix sets where the minimum distance between four columns is maximized. Still another optimized matrix set for the rank 4, Set_rank4 940, is generated in such a manner that the rank optimization unit 710 performs searching with respect to the rank 4. Set_rank4 940 includes only the candidate matrix set (Set 2) 820. In this instance, Set_rank4 940 includes only one element and thus the rank optimization unit 710 stops searching and transfers Set_rank4 940 to the codebook matrix selector 720. The codebook matrix selector 720 selects Set_rank4 940 as the codebook and generates the codebook. Depending on embodiments, the rank optimization unit 710 may independently generate the optimized matrix set for each rank, with respect to each transmission rank.

According to an aspect of the present invention, the codebook matrix selector 720 may search for only matrices that are common among the optimized matrix sets for each rank and select the found matrices as elements of the codebook. When a great number of matrices are common among all the optimized matrix sets for each rank, the elements of the codebook may be randomly selected from the common matrices. The number of elements of the codebook may be predetermined at the base station.

A scheme of computing the distance between matrices or columns of each matrix may use a chordal distance computation scheme, a Fubini-study scheme, or the like. Any type of scheme capable of computing the distance between matrices may be used for the codebook generation apparatus 300.

According to another aspect of the present invention, the codebook generation apparatus 300 may select as a base matrix a matrix that is generated by DFT. An identity matrix and the DFT matrix, selected as the base matrix, may be preliminary candidate matrices. For example, when four transmitting antennas are at the base station, a 4×4 identity matrix becomes a preliminary candidate matrix $W_1$ and the matrix that is generated by the DFT may be selected as another preliminary candidate matrix $W_2$. An example of $W_2$, the matrix that is generated by the DFT, may be represented as Equation 2:

$$W_2 = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}.$$ [Equation 2]

Depending on embodiments, a diagonal matrix or a block diagram matrix may be further included in the preliminary candidate matrix $W_2$. A block diagonal matrix $D'$ may represent a matrix, given by Equation 3:

$$D' = \begin{bmatrix} A & 0 \\ 0 & B \end{bmatrix}.$$ [Equation 3]

For example, when the block diagonal matrix $D'$ is a 4×4 matrix, each of A and B may be a 2×2 matrix. Depending on embodiments, a rotated block diagonal matrix may be further included in the preliminary candidate matrix $W_2$.

According to another aspect of the present invention, the codebook generation apparatus 300 may generate a codebook that includes $2^B$ elements. According to still another aspect of the present invention, the codebook generation apparatus 300 may generate as a base matrix a Hadamard matrix that satisfies orthogonality.

Figure 10:
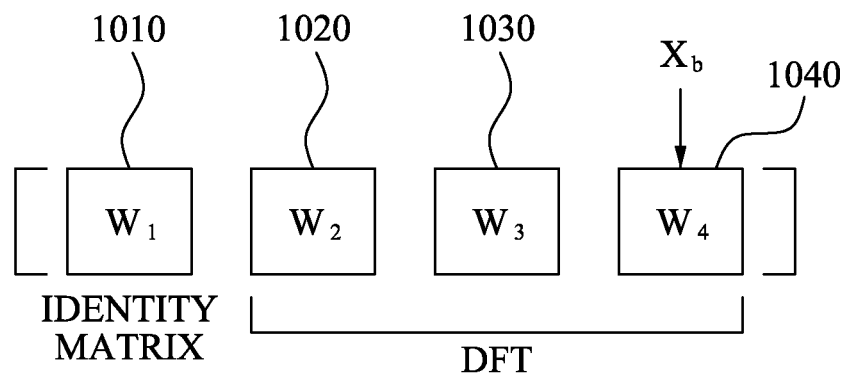
FIG. 10 illustrates an example of preliminary candidate matrices shown in FIG. 8.

FIG. 10 shows an example of preliminary candidate matrices shown in FIG. 8. The preliminary candidate matrices include matrices $W_1$ 1010, $W_2$ 1020, $W_3$ 1030, and $W_4$ 1040. The matrix 1010 is an identity matrix. The matrices 1020, 1030, and 1040 are generated by DFT. The matrix extender 310 selects the matrix $W_4$ 1040 as the base matrix. When preliminary candidate matrices are an identity matrix and matrices that are generated by the DFT, the matrix extender 310 selects as the base matrix any one of the matrices that are generated by the DFT.

Figure 11:
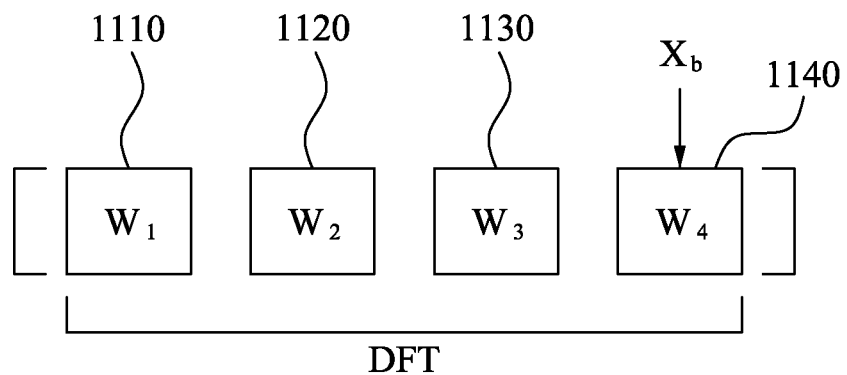
FIG. 11 illustrates another example of preliminary candidate matrices shown in FIG. 8.

FIG. 11 shows another example of preliminary candidate matrices shown in FIG. 8. As shown in FIG. 11, the preliminary candidate matrices include matrices $W_1$ 1110, $W_2$ 1120, $W_3$ 1130, and $W_4$ 1140. The matrices 1110, 1120, 1130, and 1140 are generated by the DFT. The matrix extender 310 selects the matrix $W_4$ 1140 as the base matrix. When all the preliminary candidate matrices are matrices that are generated by the DFT, the matrix extender 310 randomly selects as the base matrix any one of the matrices that are generated by the DFT.

Figure 12:
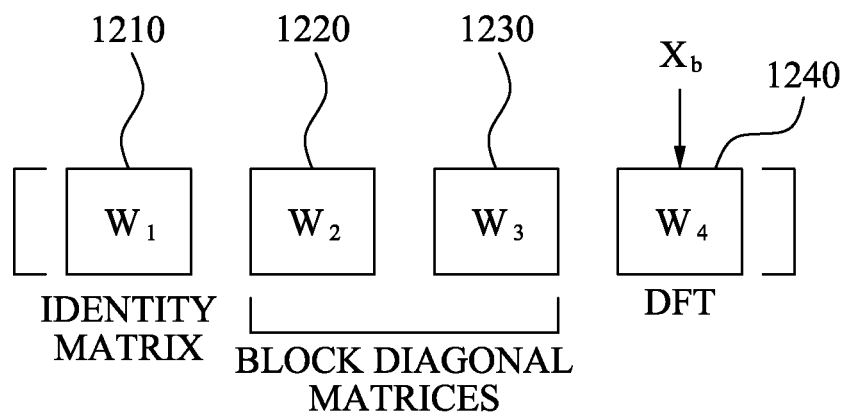
FIG. 12 illustrates still another example of preliminary candidate matrices shown in FIG. 8.

FIG. 12 shows still another example of the preliminary candidate matrices shown in FIG. 8. As shown in FIG. 12, the preliminary candidate matrices include matrices $W_1$ 1210, $W_2$ 1220, $W_3$ 1230, and $W_4$ 1240. The matrix 1210 is an identity matrix. The matrices 1220 and 1230 are block diagonal matrices. The matrix 1240 is generated by DFT. The matrix extender 310 selects the matrix $W_4$ 1240 as the base matrix. When preliminary candidate matrices are an identity matrix, a block diagonal matrix, and matrices that are generated by the DFT, the matrix extender 310 selects as the base matrix any one of the matrices that are generated by the DFT.

Figure 13:
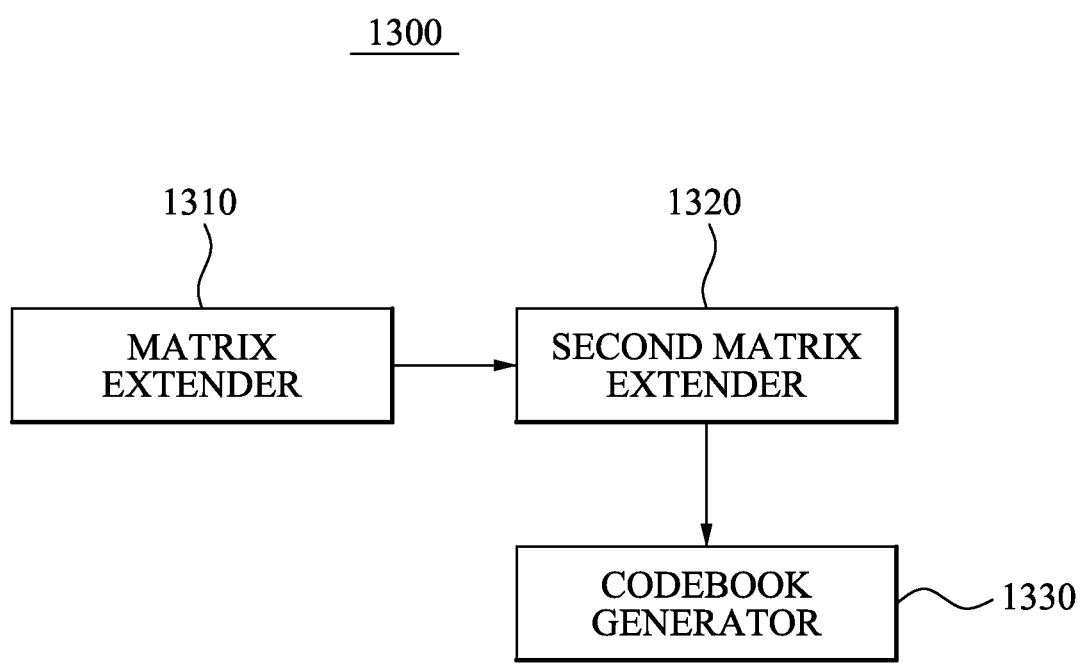
FIG. 13 is a block diagram illustrating an apparatus of generating a codebook according to another embodiment of the present invention.

FIG. 13 shows an apparatus 1300 to generate a codebook according to another aspect of the present invention. The codebook generation apparatus 1300 includes a matrix extender 1310, a second matrix extender 1320, and a codebook generator 1330.

The matrix extender 1310 generates a candidate matrix set by multiplying a base matrix and at least one diagonal matrix. The at least one diagonal matrix includes elements of a constrained set as diagonal elements. The second matrix extender 1320 performs a householder transform with respect to each of columns of a second base matrix and generates a second candidate matrix set. The codebook generator 1330 generates the codebook based on the candidate matrix set and the second candidate matrix set.

The matrix extender 1310 selects as a base matrix a matrix $W_1$ that includes elements of a constrained set $\{1, -1, j, -j\}$. The matrix $W_1$ is a matrix that is generated by DFT. An example of the matrix $W_1$ may be represented as Equation 4:

$$W_1 = \frac{1}{2} \begin{bmatrix} 1 & 1 & 1 & 1 \\ 1 & j & -1 & -j \\ 1 & -1 & 1 & -1 \\ 1 & -j & -1 & j \end{bmatrix}.$$ [Equation 4]

The matrix extender 1310 generates candidate matrices $W_2$ and $W_3$ by multiplying the base matrix W1 by diagonal matrices that include elements of the constrained set $\{1, -1, j, -j\}$ as diagonal elements. Examples of the matrices $W_2$ and $W_3$ may be represented as Equation 5:

$$W_2 = \begin{bmatrix} 1 & 0 & 0 & 0 \\ 0 & 1 & 0 & 0 \\ 0 & 0 & 1 & 0 \\ 0 & 0 & 0 & -1 \end{bmatrix} \times W_1 = \frac{1}{2} \begin{bmatrix} 1 & 1 & 1 & 1 \\ 1 & j & -1 & -j \\ 1 & -1 & 1 & -1 \\ -1 & j & 1 & -j \end{bmatrix}, \text{ and}$$ [Equation 5]

-continued $$W_3 = \begin{bmatrix} 1 & 0 & 0 & 0 \\ 0 & 1 & 0 & 0 \\ 0 & 0 & j & 0 \\ 0 & 0 & 0 & j \end{bmatrix} \times W_1 = \frac{1}{2} \begin{bmatrix} 1 & 1 & 1 & 1 \\ 1 & j & -1 & -j \\ j & -j & j & -j \\ j & 1 & -j & -1 \end{bmatrix}.$$

Elements of a second base matrix are not limited to the constrained set $\{1, -1, j, -j\}$. For example, the second matrix extender 1320 may select a matrix U as a second base matrix. The matrix U includes as an element the complex number corresponding to an 8-phase shift keying (PSK) scheme. An example of the second base matrix U may be represented as Equation 6:

$$U = \frac{1}{2}\begin{bmatrix} -1 & 0 & 0 & 0 \\ 0 & 1 & 0 & 0 \\ 0 & 0 & 1 & 0 \\ 0 & 0 & 0 & 1 \end{bmatrix} \times \begin{bmatrix} 1 & 1 & 1 & 1 \\ \frac{1+j}{\sqrt{2}} & \frac{-1+j}{\sqrt{2}} & \frac{-1-j}{\sqrt{2}} & \frac{1-j}{\sqrt{2}} \\ j & -j & j & -j \\ \frac{-1+j}{\sqrt{2}} & \frac{1+j}{\sqrt{2}} & \frac{1-j}{\sqrt{2}} & \frac{-1-j}{\sqrt{2}} \end{bmatrix}.$$ [Equation 6]

The second matrix extender 1320 may perform householder transform with respect to a first column of the second base matrix U and thereby generate a second candidate matrix $W_4$. The second candidate matrix $W_4$ may be represented as Equation 7:

$$W_4 = I_4 - 2u_1u_1^H.$$ [Equation 7]

$I_4$ is a 4×4 identity matrix and $u_1$ is a column vector that includes the first column of the second base matrix U.

The second matrix extender 1320 may perform householder transform with respect to a second column of the second base matrix U and thereby generate another second candidate matrix $W_5$. The second candidate matrix $W_5$ may be represented as Equation 8:

$$W_5 = I_4 - 2u_2u_2^H.$$ [Equation 8]

$u_2$ is a column vector that includes the second column of the second base matrix U.

The second matrix extender 1320 may perform householder transform with respect to a third column of the second base matrix U and thereby generate another second candidate matrix $W_6$. The second candidate matrix $W_6$ may be represented as Equation 9:

$$W_6 = I_4 - 2u_3u_3^H.$$ [Equation 9]

$u_3$ is a column vector that includes the third column of the second base matrix U.

The second matrix extender 1320 may perform householder transform with respect to a fourth column of the second base matrix U and thereby generate another second candidate matrix $W_7$. The second candidate matrix $W_7$ may be represented as Equation 10:

$$W_7 = I_4 - 2u_4u_4^H.$$ [Equation 10]

$u_4$ is a column vector that includes the fourth column of the second base matrix U.

The second candidate matrix set may include four second candidate matrices $W_4$, $W_5$, $W_6$, and $W_7$. The codebook generator 1330 generates a codebook of a transmission rank 1 from all columns of the candidate matrices $W_1$, $W_2$, and $W_3$ and first columns of the second candidate matrices $W_4$, $W_5$, $W_6$, and $W_7$.

Depending on embodiments, when the transmission rank is 2 or 3, the codebook generator 1330 may select from combinations of all columns of the candidate matrices $W_1$, $W_2$, and $W_3$ and the second candidate matrices $W_4$, $W_5$, $W_6$, and $W_7$, a combination of columns where the minimum distance between columns is maximized. The codebook generator 1330 generates the codebook based on the selected combination of columns.

Depending on embodiments, the matrix extender 1310 may select the candidate matrices $W_1$ and $W_2$ as block diagonal matrices. The matrix extender 1310 may generate the candidate matrix $W_3$ using the DFT.

Another example of the candidate matrices $W_1$, $W_2$, and $W_3$ may be represented as Equation 11:

$$W_1 = \frac{1}{\sqrt{2}}\begin{bmatrix} 1 & 1 & 0 & 0 \\ 1 & -1 & 0 & 0 \\ 0 & 0 & 1 & 1 \\ 0 & 0 & 1 & -1 \end{bmatrix},$$ [Equation 11]

$$W_2 = \frac{1}{\sqrt{2}}\begin{bmatrix} 1 & 1 & 0 & 0 \\ j & -j & 0 & 0 \\ 0 & 0 & 1 & 1 \\ 0 & 0 & j & -j \end{bmatrix}, \text{ and}$$

$$W_3 = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}.$$

Depending on embodiments, the matrix extender 1310 may select the candidate matrix $W_1$ as a 4×4 identity matrix. The matrix extender 1310 may generate the candidate matrix $W_2$ using the DFT. The matrix extender 1310 may generate the candidate matrix $W_3$ by multiplying the candidate matrix $W_2$ by a diagonal matrix. Another example of the candidate matrices $W_2$ and $W_3$ may be represented as Equation 12:

$$W_2 = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}, \text{ and}$$ [Equation 12]

$$W_3 = \begin{bmatrix} 1 & 0 & 0 & 0 \\ 0 & 1 & 0 & 0 \\ 0 & 0 & 1 & 0 \\ 0 & 0 & 0 & -1 \end{bmatrix} \times W_2 = \frac{1}{2}\begin{bmatrix} 1 & 1 & 1 & 1 \\ 1 & j & -1 & -j \\ 1 & -1 & 1 & -1 \\ -1 & j & 1 & -j \end{bmatrix}.$$

Depending upon embodiments, the constrained set may include complex numbers corresponding to points that are generated by dividing the circumference of the complex plane into eight portions. Elements of the constrained set may be complex numbers corresponding to an 8-PSK scheme.

Figure 4:
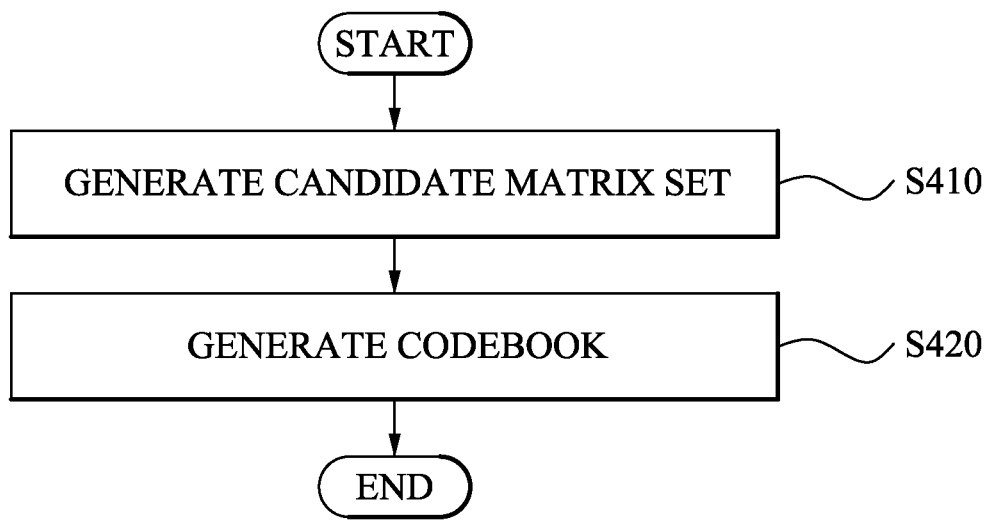
FIG. 4 is a flowchart illustrating a method of generating a codebook according to an embodiment of the present invention.

FIG. 4 is a flowchart of a process of generating a codebook according to another aspect of the present invention. In operation S410, a candidate matrix set is generated by multiplying a base matrix and at least one diagonal matrix. The at least one diagonal matrix includes elements of a constrained set as diagonal elements. According to other aspects of the present invention, the candidate matrix set can be generated by multiplying the base matrix and all the diagonal elements that are obtainable from the elements of the constrained set.

In operation S420, a codebook where a minimum distance between the elements is maximized is generated, based on the candidate matrix set. According to some aspects of the present invention, an element of the codebook may be a matrix that includes a predetermined number of columns based on a number of simultaneously transmitted data streams, that is, a transmission rank. For example, when M transmitting antennas are at the base station and a transmission rank is R, the element of the codebook is an M×R matrix.

Operation S420 may include generating an optimized matrix set for each rank that includes optimized elements, with respect to all possible cases of the number of simultaneously transmitted data streams. In the generating of the optimized matrix set, the optimized matrix set for each rank may be generated from the optimized elements so that the minimum distance between the same number of columns as the transmission rank may be maximized. For example, when M transmitting antennas are at the base station, the possible transmission rank should be any one of 1 through M. Therefore, the optimized matrix set may be generated for each transmission rank by searching for the optimal combination with respect to the transmission rank of 1 through M.

Operation S420 may include an operation of generating, as the codebook, a matrix set that is common among the optimized matrix sets for each rank. Depending on embodiments, operation S420 may include generating the codebook based on a preliminary candidate matrix set, the base matrix, and the candidate matrix set. The preliminary candidate matrix set may include matrices with only the elements of the constrained set. Depending on embodiments, operation S420 may further include an operation of performing householder transform with respect to each of columns of a second base matrix and generate a second candidate matrix set.

According to other aspects of the present invention, in operation S420, the codebook may be generated based on the candidate matrix set and the second candidate matrix set. The constrained set may be $\{1, -1, j, -j\}$. The codebook may include $2^B$ elements.

Aspects of the present invention can also be embodied as computer-readable codes on a computer-readable recording medium and can be realized in a common digital computer executing the program using a computer-readable recording medium. The computer-readable recording medium is any data storage device that can store data which can be thereafter read by a computer system. Examples of the computer-readable recording medium include read-only memory (ROM), random-access memory (RAM), CD-ROMs, DVDs, magnetic tapes, floppy disks, and optical data storage devices. Aspects of the present invention may also be embodied as a computer data signal in a carrier wave comprising a compression source code segment and an encryption source code segment (such as data transmission through the Internet). The computer-readable recording medium can also be distributed over network coupled computer systems so that the computer-readable code is stored and executed in a distributed fashion. Moreover, the hard disk drive can be used with a computer, can be a portable drive, and/or can be used with a media player.

According to aspects of the present invention, an apparatus and method of generating a codebook is provided that can maintain advantages of a closed-loop communication control scheme applied in a MIMO communication system and also can be easily realized in hardware of a user equipment.

According to other aspects of the present invention, an apparatus and method of generating a codebook is provided that can more effectively transmit data in comparison to a conventional data transmission mode selecting method with respect to a user equipment, even in an environment where a value that describes a channel feature is constrained.

Although a few embodiments of the present invention have been shown and described, it would be appreciated by those skilled in the art that changes may be made to this embodiment without departing from the principles and spirit of the invention, the scope of which is defined by the claims and their equivalents.

What is claimed is:

1. An apparatus configured to generate a codebook to transmit and receive data to and from a plurality of user equipment, the apparatus comprising:
   a matrix extender configured to generate a candidate matrix set by multiplying a base matrix and each of diagonal matrices, wherein each of the diagonal matrices comprises elements of a constrained set as diagonal elements, and a number of the diagonal matrices is $A^{M-1}-1$, where A denotes a number of the elements of the constrained set, and M denotes a number of transmitting antennas; and
   a codebook generator configured to generate the codebook where a minimum distance between elements of the codebook is maximized, based on the candidate matrix set.

2. The apparatus according to claim 1, wherein an element of the codebook is a matrix that comprises a predetermined number of columns based on a number of transmitted data streams.

3. The apparatus according to claim 1, wherein the codebook generator comprises:
   a rank matrix generator configured to generate rank matrices from each element of the candidate matrix set, wherein each of the rank matrices comprises the same number of columns as a number of simultaneously transmitted data streams; and
   a rank matrix selector configured to select a predetermined number of the rank matrices to generate the codebook.

4. The apparatus according to claim 1, wherein the codebook generator comprises:
   a rank optimization unit configured to generate an optimized matrix set for each rank that comprises optimized elements, wherein each rank denotes each of at least one transmitted data stream; and
   a codebook matrix selector configured to generate, as the codebook, a matrix set that is common among the optimized matrix set for each rank.

5. The apparatus according to claim 4, wherein the rank optimization unit is further configured to:
   generate the optimized matrix set for each rank that comprises the optimized elements so that a minimum distance between columns of each of the optimized elements is maximized, wherein each of the optimized elements comprises the same number of the columns as a number of transmitted data streams.

6. The apparatus according to claim 1, wherein the base matrix is either a matrix that is generated by a digital Fourier transform (DFT), or a Hadamard matrix that satisfies orthogonality.

7. The apparatus according to claim 1, wherein the constrained set is $\{1,-1, j, -j\}$.

8. The apparatus according to claim 1, wherein the codebook generator is further configured to:
   generate the codebook based on a preliminary candidate matrix set, the base matrix, and the candidate matrix set, wherein the preliminary candidate matrix set comprises matrices with only the elements of the constrained set.

9. The apparatus according to claim 8, wherein the preliminary candidate matrix set comprises a matrix that is generated by DFT, or a diagonal matrix, or a block diagonal matrix, or a Hadamard matrix that satisfies orthogonality, or any combination thereof.

10. The apparatus according to claim 1, further comprising:
a second matrix extender configured to perform a householder transform with respect to each of columns of a second base matrix, and generate a second candidate matrix set,
wherein the codebook generator is further configured to generate the codebook based on the candidate matrix set and the second candidate matrix set.

11. The apparatus according to claim 10, wherein when a number of transmitted data streams is one, the codebook generator is further configured to generate the codebook from a first column of each element of the second candidate matrix set and all columns of elements of the candidate matrix set.

12. The apparatus according to claim 10, wherein when a number of transmitted data streams is two, the codebook generator is further configured to generate the codebook from all columns of elements of the candidate matrix set and the second candidate matrix set.

13. A method of generating a codebook to transmit and receive data, comprising:
generating a candidate matrix set by multiplying a base matrix and each of diagonal matrices, wherein each of the diagonal matrices comprises elements of a constrained set as diagonal elements, and a number of the diagonal matrices is determined based on a number of the elements of the constrained set; and
generating the codebook where a minimum distance between elements of the codebook is maximized, based on the candidate matrix set,
wherein the generating of the codebook comprises,
generating an optimized matrix set for each rank that comprises optimized elements, wherein each rank denotes each of at least one transmitted data stream, and
generating, as the codebook, a matrix set that is common among the optimized matrix set for each rank, and
wherein the generating of the candidate matrix set, or the generating of the codebook, or any combination thereof is implemented by a processor.

14. The method according to claim 13, wherein an element of the codebook is a matrix that comprises a predetermined number of columns based on a number of transmitted data streams.

15. The method according to claim 13, wherein the generating of the optimized matrix set comprises:
generating the optimized matrix set for each rank that comprises the optimized elements so that the minimum distance between columns of each of the optimized elements is maximized, wherein each of the optimized elements comprises the same number of the columns as a number of transmitted data streams.

16. The method according to claim 13, wherein the generating of the codebook comprises:
generating the codebook based on a preliminary candidate matrix set, the base matrix, and the candidate matrix set,
wherein the preliminary candidate matrix set comprises matrices with only the elements of the constrained set.

17. The method according to claim 13, further comprising:
performing a householder transform with respect to each of columns of a second base matrix, and generating a second candidate matrix set,
wherein the generating of the codebook comprises generating the codebook based on the candidate matrix set and the second candidate matrix set.

18. A non-transitory computer-readable recording medium storing a program to implement a method of generating a codebook to transmit and receive data, the method comprising:
generating a candidate matrix set by multiplying a base matrix and each of diagonal matrices, wherein each of the diagonal matrices comprises elements of a constrained set as diagonal elements, and a number of the diagonal matrices is determined based on a number of the elements of the constrained set; and
generating the codebook where a minimum distance between elements of the codebook is maximized, based on the candidate matrix set,
wherein the generating of the codebook comprises
generating an optimized matrix set for each rank that comprises optimized elements, wherein each rank denotes each of at least one transmitted data stream, and
generating, as the codebook, a matrix set that is common among the optimized matrix set for each rank.

19. A communication apparatus configured to communicate data based on a codebook,
wherein the codebook is generated based on a candidate matrix set to maximize a minimum distance between elements of the codebook, and a second candidate matrix set,
wherein the candidate matrix set is generated by multiplying a base matrix and each of diagonal matrices, each of the diagonal matrices comprising elements of a constrained set as diagonal elements, and a number of the diagonal matrices being determined based on a number of the elements of the constrained set,
wherein the second candidate matrix is generated by performing a householder transform with respect to each of columns of a second base matrix.

20. The communication apparatus according to claim 19, wherein an element of the codebook is a matrix that comprises a predetermined number of columns based on a number of transmitted data streams.

* * * * *